United States Patent [19]

Grimm et al.

[11] Patent Number: 4,545,678

[45] Date of Patent: Oct. 8, 1985

[54] METHOD AND APPARATUS FOR TESTING LENSES

[75] Inventors: Wolfgang Grimm, Heidenheim; Hermann Schürle, Aalen, both of Fed. Rep. of Germany

[73] Assignee: Carl-Zeiss-Stiftung, Heidenheim on the Brenz, Fed. Rep. of Germany

[21] Appl. No.: 510,264

[22] Filed: Jul. 1, 1983

[30] Foreign Application Priority Data

Jul. 7, 1982 [DE] Fed. Rep. of Germany ....... 3225343

[51] Int. Cl.$^4$ .............................................. G01B 9/00
[52] U.S. Cl. ..................... 356/124; 356/239; 356/389; 356/394
[58] Field of Search ............... 356/124, 125, 126, 127, 356/389, 391, 392, 393, 394, 239

[56] References Cited

U.S. PATENT DOCUMENTS

| | | | |
|---|---|---|---|
| 3,713,741 | 1/1973 | Sheehan | 356/392 |
| 3,723,010 | 3/1973 | McCrickered et al. | 356/124 |
| 3,976,383 | 8/1976 | Olsen | 356/394 |
| 4,310,242 | 1/1982 | Genco et al. | 356/239 |
| 4,386,849 | 6/1983 | Häeusler et al. | 356/124 |
| 4,461,570 | 7/1984 | Task et al. | 356/239 |

Primary Examiner—R. A. Rosenberger
Attorney, Agent, or Firm—Stonebraker, Shepard & Stephens

[57] ABSTRACT

The invention concerns a method and apparatus for testing aspherical lenses, particularly continuous-focus eyeglass lenses. The negative picture (7) of a test pattern (1) is produced by means of a master lens (4) which is placed in the ray path of the optical system (6) of the testing device. (FIG. 1). Thereupon the negative picture is projected back onto the test pattern over said ray path, which is now traversed in the opposite direction. If the specimen to be tested is now substituted for the master lens, light edges appear in the plane of the test pattern and give information as to the deviations of the distribution of the refractive power of the test specimen from the desired values of the master lens.

14 Claims, 5 Drawing Figures

METHOD AND APPARATUS FOR TESTING LENSES

SUMMARY OF THE INVENTION

The present invention relates to a method and an apparatus for testing lenses having locally non-uniformly distributed surface powers.

Continuous-focus eyeglass lenses are being used to an increasing extent in ophthalmology, that is, eyeglass lenses which have a plurality of locally different surface powers with transition between the different regions being continuous. In such lenses, at least one of their surfaces deviates from rotational symmetry, i.e. is aspherical.

Upon their manufacture, lenses in general, and in particular eyeglass lenses, must be examined in order to see whether and how well they have the desired surface power or powers. This examination is generally effected by interference in the case of spherical lenses. For this purpose, a test lens having a curvature of equal amount but opposite sign is placed on the surface to be tested and the interference phenomena produced in the very thin layer of air between the two surfaces are observed.

It can readily be understood that such quality testing can scarcely be carried out in the case of aspherical lenses and that furthermore it is very expensive.

Measuring the surface to be tested from point to point by means of a feeler gives, it is true, precise results but it is so cumbersome and expensive that from a practical standpoint it cannot be used for production control.

The object of the present invention is now to provide a method and an apparatus for testing lenses with locally non-uniform surface powers, which method can be easily and economically carried out and permits a very rapid conclusion as to where and how the surface powers of the specimen being tested differ from the desired surface powers.

This object is achieved, first of all, by providing a picture of a test pattern produced over a ray path which contains a master lens (master), the test pattern being photographically recorded. Then this test picture is transilluminated and projected over the same ray path, in which the lens to be tested is now arranged instead of the master lens, onto the test pattern. Finally the local distribution of the deviation of the surface power of the test specimen from the desired surface power is determined from the deviation between the test pattern and the projection of the test picture.

In this method, therefore, a test pattern of any desired shape is projected onto a plane with the interposition of the master lens, i.e. the lens which has the desired surface powers, and the test picture produced there is recorded. If, now, the test picture is again projected onto the test pattern by means of the same optical system but now passing through it in opposite direction, then no difference can be noted as long as the master lens is in the ray path. On the other hand, if the master lens is replaced by the lens to be tested, then the test picture projected by it differs from the test pattern as a function of the errors in the test specimen. It can be noted at a glance if such a deviation is present and where it is.

It is advisable to record the test picture as a negative of the test pattern. In such case, therefore, a uniformly black area is produced upon the testing in the plane of the test pattern as long as the test specimen does not have any defects. On the other hand, if the specimen being tested is defective, then white borders are evident in the plane of the test pattern.

Under certain conditions it may also be advisable to color the negative picture so that therefore errors in the specimen being tested are indicated in the plane of the test picture by colored edges.

It is particularly advantageous for the test pattern to be developed in such a manner that its thickness of line corresponds to the deviation tolerance. This deviation tolerance can, for instance, be fixed at $\frac{1}{8}$ diopter, which, in an example carried out, leads to line thicknesses of 0.7 mm of the test pattern.

As test picture there can be used, for instance, a pattern of lines lying uniformly in parallel alongside of each other, i.e. a grating. In this case, the light edges caused by defects in the specimen being tested can be noted particularly easily.

It is also possible to develop the method in the manner that after the test picture has been produced in the test-picture plane, the original test pattern used to produce it is replaced by one which, instead of the lines, contains bright bands which are edged by dark lines. Upon the actual testing, therefore, a line of the test picture is projected between the lines of the new test pattern. In this case also any light edges caused by defects are particularly clearly evident.

In the apparatus for carrying out the testing method described, a mount is provided between the plane of the test pattern and the test-picture plane in order to support the master lens and the lens to be tested, as well as an objective with diaphragm of small aperture arranged in front of it. The small aperture in the imaging ray path serves to compensate for large differences in power of the specimen being tested.

If the test method in accordance with the invention is used for testing continous-focus eyeglass lenses, it is advisable to arrange the test pattern in a plane which is inclined at an angle to the optical axis of the ray path and to make this inclination adjustable. In this way, the distribution of the power over the continuous-focus surface can be compensated for to a certain extent.

BRIEF DESCRIPTION OF THE DRAWINGS

The invention will be explained in further detail below with reference to the accompanying drawings in which.

DETAILED DESCRIPTION

Figure 1:
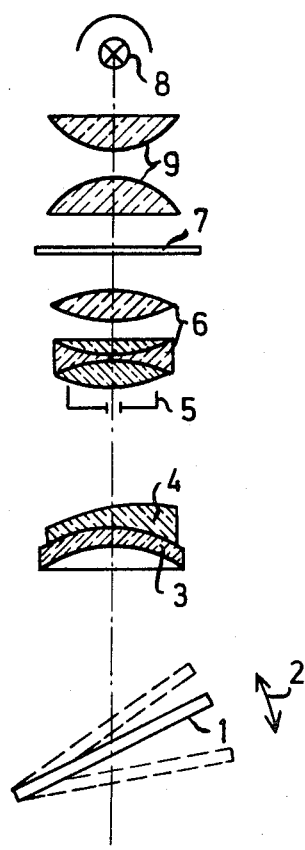
FIG. 1 shows a first embodiment of apparatus in accordance with the invention.

In FIG. 1, a surface which serves for the placing on of a test pattern is indicated at 1. This test pattern may, for instance, have the shape of a grating shown in FIG. 2a. Its surface 1 is inclined and the inclination is adjustable, as indicated by the double-ended arrow 2. There is a support 3 for holding the speciment 4 to be tested. There is a diaphragm 5 of small aperture which may, for instance, have a diameter of 1.0 mm. Behind this diaphragm there is an objective 6 which, together with the lens 4, produces a picture of the test pattern in the plane 7. This test picture may, for instance, have the shape shown in FIG. 2b when the test specimen 4 is developed as a continuous-focus eyeglass lens.

The test picture produced in the plane 7 is photographed so that it represents, for instance, a negative picture of the test pattern.

For the actual testing, the test picture, located in the plane 7, is now transilluminated by a source of light 8 and a condenser 9 and projected by means of the optical system 6, 5, 4 onto the test pattern arranged in the surface 1.

Figure 2A:
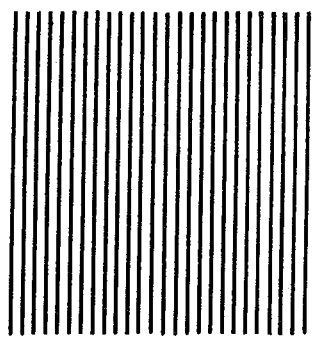
FIG. 2a shows a test pattern.
Figure 2B:
FIG. 2b shows the test picture produced by this test pattern upon the interposition of a continuous-focus eyeglass lens in the projecting ray path.

If the master lens 4 remains in the ray path then the black lines produced by the negative picture of the test pattern arranged in the plane 7 precisely fill out the spaces between these lines in the test pattern of FIG. 2a. Therefore a uniformly black image is observed in the plane 1.

If the master lens 4 is now replaced by a lens which is to be tested, then bright light edges appear in the surface 1 of the test pattern, which give direct information as to the local deviation of the surface power of the specimen being tested from the desired surface power.

Figure 3:
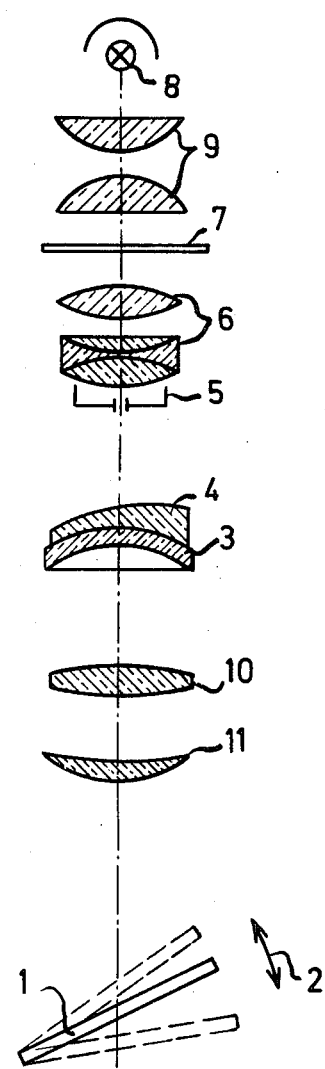
FIG. 3 shows a second embodiment of the test apparatus.

In the embodiment shown in FIG. 3, a compensating optical system is arranged between the test pattern and the support 3, the system consisting of a field lens 10 and a compensating lens 11. This optical system serves to compensate for a predetermined part of the dioptric power of the specimen being tested.

Figure 4:
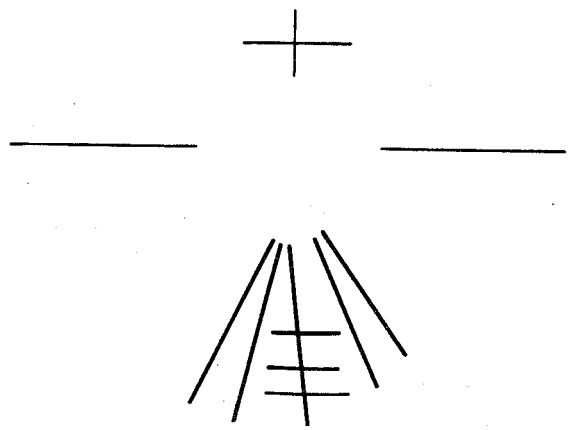
FIG. 4 shows a second embodiment of test pattern, such as used, for instance, for the testing of continous-focus eyeglass lenses.

The apparatus described and shown can be used to particular advantage for the testing of continuous-focus eyeglass lenses, particularly also in production control. For the testing of such lenses there is preferably used a device which corresponds to the embodiment of FIG. 3, in which case the test picture can, for instance, have the shape shown in FIG. 4.

What is claimed is:

1. The method of testing lenses having locally non-uniformly distributed surface powers, which comprises substantially the steps of:
   (a) providing a master lens having desired surface powers;
   (b) providing an original test pattern;
   (c) providing a ray path, and placing said master lens and said test pattern in said ray path;
   (d) projecting light along said ray path successively from said test pattern and through said master lens onto a receiving surface to produce an image thereon;
   (e) making a photographic record of said image;
   (f) placing said record in said ray path at said receiving surface;
   (g) substituting a lens to be tested for said master lens in said ray path;
   (h) providing a comparison test pattern in said ray path at the location occupied by said original test pattern when light was projected to produce said image;
   (i) projecting light along said ray path in a reverse direction successively through said record and said lens to be tested to the location of said comparison test pattern, to produce an image of said record at said location; and
   (j) observing the relation of said image of said record to said comparison test pattern to determine possible deviation of surface powers of the lens being tested from those of said master lens.

2. The invention defined in claim 1, wherein said comparison test pattern used in said steps (h) and (i) is substantially the same test pattern used in said step (d).

3. The invention defined in claim 1, wherein said comparison test pattern used in said steps (h) and (i) is different from the original test pattern used in said step (d).

4. The invention defined in claim 1, wherein said record is a negative of said image of said test pattern.

5. The invention defined in claim 4, wherein said negative record is colored.

6. The invention defined in claim 1, wherein said original test pattern is a grating-like pattern of parallel lines.

7. The invention defined in claim 1, wherein said original test pattern is a special pattern including non-parallel lines specially adapted for testing continous-focus eyeglass lenses.

8. Apparatus for testing lenses comprising
   (a) means providing a ray path along which light may be projected in either direction;
   (b) holding means at a first location in said ray path for holding an original test pattern and holding, alternatively, a comparison test pattern;
   (c) holding means at a second location in said ray path for holding a master lens having desired surface powers and holding, alternatively, a lens to be tested;
   (d) holding means at a third location in said ray path for holding a receiving surface for receiving an image of said original test pattern when light is projected along said ray path in a first direction from said test pattern through a master lens held in said second location and onto said receiving surface in said third location, and for holding, alternatively, a record relating to such image; and
   (e) means for projecting light along said ray path in a reverse direction, from a record held at said third location through a lens to be tested held at said second location and onto a comparison test pattern held at said first location,
   (f) so that possible deviations in surface powers of the lens being tested from those of said master lens may be determined by observing the relation of said comparison test pattern to the projection of said record through the lens being tested onto said comparison test pattern.

9. The invention defined in claim 8, further comprising a diaphragm of relatively small aperture arranged in said ray path between said second location and said third location.

10. The invention defined in claim 8, further comprising a compensating optical system (10, 11) arranged in said ray path between said first location and said second location to compensate for a predetermined part of the dioptric power of a lens being tested.

11. The invention defined in claim 8, wherein said test pattern includes lines the thickness of which corresponds to permissible tolerance deviation in a lens being tested from characteristics of said master lens.

12. The invention defined in claim 8, wherein said holding means at said first location holds said test pattern at an inclination to the optical axis of said ray path.

13. The invention defined in claim 12, wherein said inclination is adjustable.

14. The invention defined in claim 8, wherein said test pattern includes non-parallel lines specially adapted for testing continuous-focus eyeglass lenses.

* * * * *